United States Patent [19]

Yoshigai

[11] Patent Number: 4,678,349

[45] Date of Patent: Jul. 7, 1987

[54] BUSH USED FOR BICYCLE BRAKE DEVICE

[75] Inventor: Toshiharu Yoshigai, Higashi-Osaka, Japan

[73] Assignee: Yoshigai Kikai Kinzoku Kabushiki Kaisha, Osaka, Japan

[21] Appl. No.: 814,778

[22] Filed: Dec. 30, 1985

[30] Foreign Application Priority Data

Apr. 4, 1985 [JP] Japan .............................. 60-50228[U]

[51] Int. Cl.⁴ ........................ F16C 17/10; F16C 27/02
[52] U.S. Cl. .................................. 384/125; 384/192; 384/297
[58] Field of Search ............... 384/125, 192, 202, 215, 384/220, 222, 223, 276, 280, 281, 296, 297, 299, 275

[56] References Cited

U.S. PATENT DOCUMENTS 3,231,301 1/1966 Gray .................. 384/125 X
3,829,184 8/1974 Cheuret .................. 384/220 X
3,966,276 6/1976 Bellarbre et al. ................ 384/215

Primary Examiner—Stuart S. Levy
Assistant Examiner—David Werner
Attorney, Agent, or Firm—Sixbey, Friedman & Leedom

[57] ABSTRACT

A bush made of plastic for use in a bicycle brake device of the type having a cylindrical portion integrally connected with a flange, which is provided at one end of the cylinderical portion, has the flange provided, successively, from the cylindrical portion toward an outer edge of the flange with a flat part, a bulged part following the flat part, and an inclined and flat part, which follows the bulged part and is inclined outwardly from in a direction opposite to the bulged portion relative to the end of the cylindrical portion. The flange construction maintains a gap between two members in a cushioning manner and enables a reduced frictional resistance.

4 Claims, 6 Drawing Figures

BUSH USED FOR BICYCLE BRAKE DEVICE

FIELD OF THE INVENTION AND DESCRIPTION OF THE RELATED ART

The present invention relates to improvements in a synthetic-resin-made bush used for a part supporting rotatably or supporting various kinds of actuating members of a bicycle brake.

The bicycle brake, which is equipped with a lever device operating the brake and a controller controlling the brake with a rotatably supporting shaft and a supporting shaft, frequently uses a bush with a flange which is made of the soft synthetic resin such as nylon and the like so that a smooth rotational motion to and fro may be imparted to the afore-mentioned shafts, a rolling may be prevented, while a gap between the two members adjoining to each other is being maintained, and at the same time a frictional force may be minimumized. According to the official gazette of Japanese Utility Model publication No. SHO (50)-28530, for example, such several kinds of bushes are used in the lever device. As illustrated in FIGS. 4–6, they have the following construction: Namely, 1 is a housing, into which the base of the lever 2 is internally inserted so that the base of the lever 2 is rotatably to and fro supported by the supporting shaft 3. An auxiliary lever 4 is rotatably supported by the end of the supporting shaft 3 and extends to the outside of the housing 1, the aforementioned housing 1 being fixed to a handle bar 6 by a fastening band 5. The part supporting the afore-mentioned lever 2 and auxilary lever 4 is equipped with a plurality of bushes A with a flange, made of synthetic resin, which are fitted into the supporting shaft 3.

As shown in FIG. 5, the bush A has a construction in which the flange 9 is extended in a direction perpendicular to the shaft center of a cylindrical portion 7 and possessing a flat face 8a is provided on one end of the cylindrical portion 7.

Referring now to FIG. 6, illustrating the state of using the bush A, 10 is a fixing member corresponding to the housing 1, 11 is a rotatable member corresponding to the lever 2, 12 is the supporting shaft, the cylindrical portion of the bush A is interposed between the rotatable member 11 and the supporting shaft 12, the flange 9 of the bush A is in interposed contact between the internal wall 10a of the fixing member 10 and the external wall 11a of the rotational member 11. This construction, at the same time that the rotational member 11 is to be rotated to and fro, permits a smooth rotation to be made on the supporting shaft 12. The flange 9 maintains the gap between both the members 10 and 11, and prevents the rotational member 11 from being rolled. Under the foregoing construction, however, there is a problem making it difficult to realize a smooth rotation due to a frictional force caused by a close touching of both the front and black flat faces 8a and 8b of the flange 9 by the internal wall 10a of the fixing member 10 and the external wall of the rotational member 11. Furthermore, because there is no cushion around the flange 9 and shrinks the bush in, the winter the bush is made of the synthetic resin, the rotational member 11 will give rise to such a backlash as will cause rolling and the like. In addition, as shown in FIG. 6, since a boss 10b is provided in the vicinity of a shaft hole on the internal wall 10a of the fixing member 10, when a primary assembling is commenced, the edge part 8c of the external peripheral corner of the flange 9 makes contact with the external peripheral corner 10c of the aforementioned boss 10b so that a problem results in that there is a serious difficulty in making such an assembly.

OBJECT AND OUTLINE OF THE INVENTION

The primary purpose of the present invention is to provide a bush which will not only enable the lever device in the bicycle and the rotatably supporting shaft and the supporting shaft of the control device to be smoothly rotated to and fro, but also will prevent the rotational member from being rolled, while maintaining the gap between the adjoining two members.

The second purpose of the present invention is to provide a bush, made of synthetic resin, having an externally extending flange provided on one end of the cylindrical portion, wherein the above flange is provided, successively from the cylindrical portion toward an outer edge, with a flat part, a bulged part following the flat part, and an inclined and flat part, which follows the bulged part and is inclined outwardly in a direction opposite to the bulging of the bulged portion, relative to the end of the cylindrical portion, whereby the aforementioned flange prevents the member from being rolled, while it maintains the gap between the two members in a cushioning manner and enables a reduced frictional resistance to ensure a smooth rotation of the rotatably supporting shaft and the supporting shaft.

The third purpose of the present invention is to provide a bush which is easy to incorporate even when a boss is provided on the fixing member.

Since the bush according to the present invention employs a flange 19 with a special-shaped construction that it is equipped from the internal periphery to the outside with the annular flat part 20, the bulged part 21, and the inclined and flat part 22, in the case where the bush, being fitted into the supporting shaft 12, is incorporated into the part between the fixing member 10 and the rotational member 11, the inside of the flange 19 is adapted to provide a resilient impact force, thereby producing a cushioning effect between both the members 10 and 11 and, at the same time, whereby a reduced touching area of the internal and external walls 10a and 11a of both the members 10 and 11 with the flange 19, consisting only of the contact by the top (top line) of the bulged part 21 and the end part 22a of the inclined and flat part 22, enables the rotational member 11 to be rotated smoothly on the bush B or to be rotatively operated smoothly with respect to the fixing member 10, even if the rotational member 11 is rotated together with the bush B, in both the cases of which no rolling phenomenon takes place. Even when a construction with a boss 10b is provided on the fixing member 10, since the end part 22a of the inclined and flat part 22 does not get in contact with the edge part 10c, the bush is easy to incorporate.

DETAILED DESCRIPTION OF THE PREFERRED EMBODIMENT OF THE INVENTION

Figure 1:
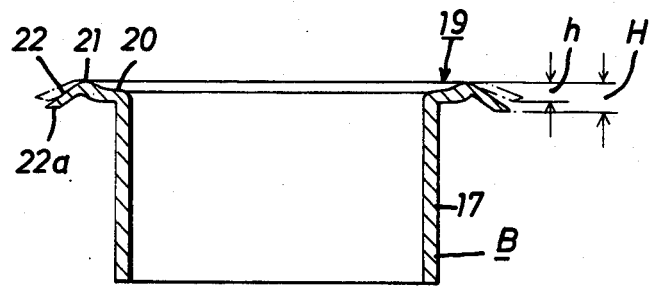
FIG. 1 is a sectional view of the bush according to the present invention.

A detailed description of the present invention will be made in conjunction with the drawings as follows:

The common members in the drawings respectively are designated by common reference numerals.

The bush B, illustrated in section in FIG. 1, according to the present invention has a cylindrical portion 17 is fitted into the supporting shaft 12, one end of the cylindrical portion 17 being equipped with an externally extending flange 19. This flange 19 is a from the internal periphery, successively provided with an annular flat part 20, an inverted V-shaped and annular bulged part 21 following the flat part 20, and an inclined and flat part 22 which follows the bulged part 21. Part 22 is externally inclined relative to a plane; through the function of the flat part 20 with the end of the cylindrical portion 17, that is perpendicular to the shaft line (longitudinal axis) of the cylindrical portion 17. An end part 22a of the inclined and flat part 22 which may be brought into alignment with the plane perpendicular to the shaft line (longitudinal axis) of the cylindrical portion 17. There is a necessity that the height H of the flange 19 is larger than the gap amount h between the two members which is measured, when mounting the bush B therebetween. Furthermore, the bush B, is approximately the same in overall thickness, and is integrally formed of the solid synthetic resin that possesses such a resilience as the nylon and the like has as well as has wear resistance.

Figure 2:
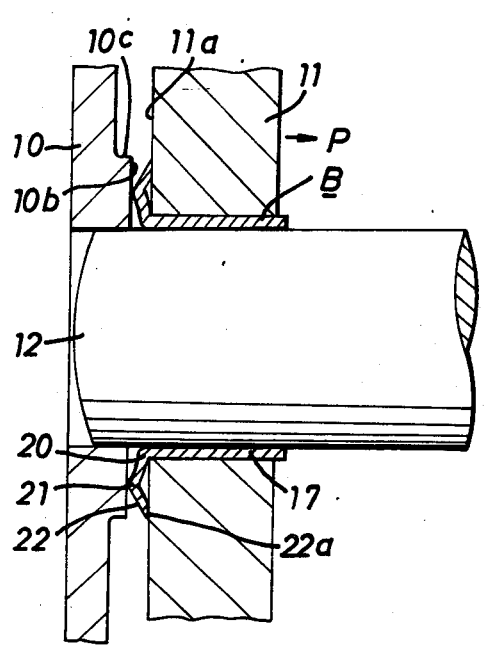
FIG. 2 is a sectional view of the mounted state of the bush.
Figure 6:
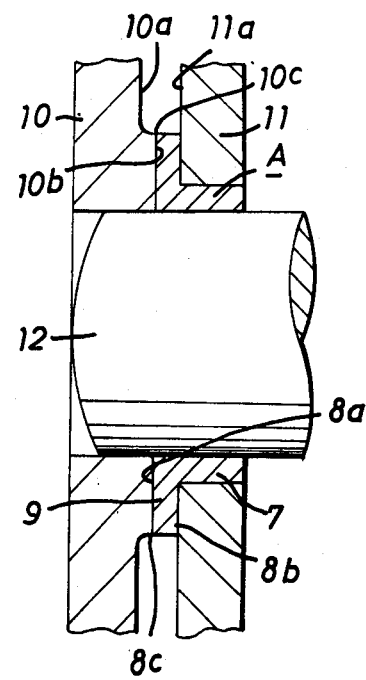
FIG. 6 is an enlarged view of a detail of FIG. 4.
Figure 4:
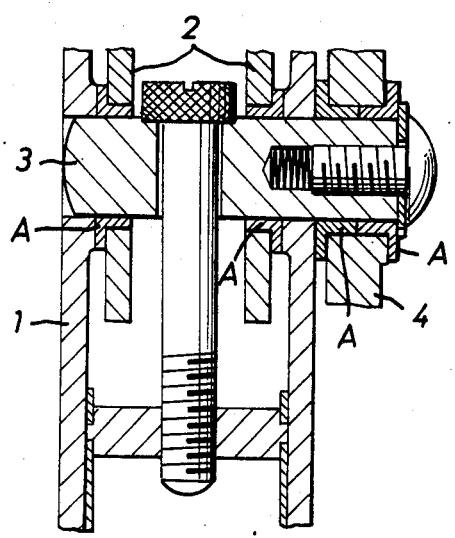
FIG. 4 is a sectional view equivalent to one, taken on the line III—III of FIG. 3, but showing the mounted state of a conventional bush.
Figure 5:
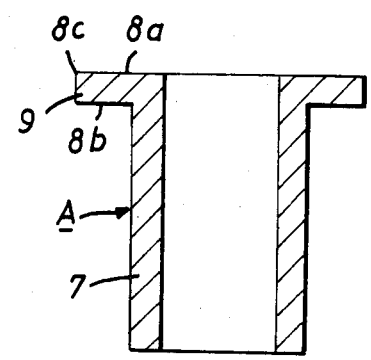
FIG. 5 is a sectional view of the conventional bush.
Figure 3:
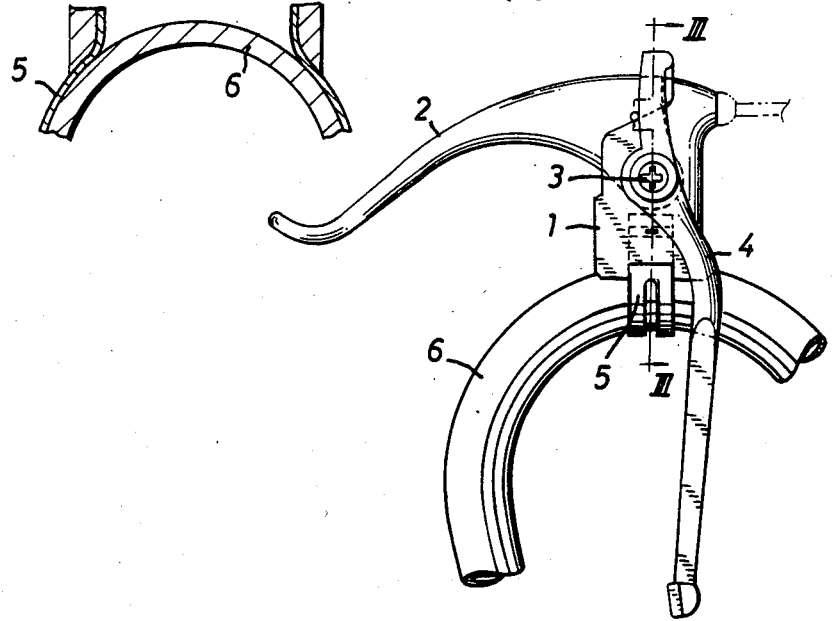
FIG. 3 is a perspective view of a brake lever using the bush according to the present invention.

Referring now to FIG. 2, illustrating the state wherein the bush B according to the present invention is assembled such that it is fitted onto the supporting shaft 12, is located between the fixing member 10 and the rotating member 11, and the flange 19 is pressurized exclusively to one side so as to be deflected, at a fulcrum formed at a top point of the bulged part 21, from the solid line to the phantom line positions of FIG. 1 so that it is reduced in height from H to h. In that time, the annular bulged part 21 is brought into increased contact with the internal wall 10a of the fixing member 10, i.e. internal wall of the boss 10b in the illustrated example in a linear manner, while the end part 22a of the annular inclined and flat part 22 of the flange 19 makes increased contact with the external wall 11a of the rotating member 11, the flange 19, which inherently applies an impact force, being interposed between the fixing member 10 and the rotating member 11. The rotating member 11 is adapted not to be moved in an arrow direction P.

What is claimed is:

1. A bush made of plastic for use in a bicycle brake device, comprising a cylindrical portion connected integrally with a flange which is provided at one end of the cylindrical portion and extends radially outwardly from said end generally perpendicular to a longitudinal axis of the cylindrical portion;

wherein the flange is, in a direction from the cylindrical portion to an outer edge, successively comprised of;

an annular flat portion which is directly connected with said end of the cylindrical portion and extends perpendicular to the longitudinal axis of the cylindrical portion;

a bulged portion which is connected with the annular flat portion and bulges axially beyond said end of the cylindrical portion; and an inclined annular portion which is connected with the bulged portion and extends, relative to said end of the cylindrical portion, in an axial direction opposite to the bulging of the bulged portion, an outer edge portion of the inclined annular portion being displaceable into alignment with a plane passing through said end of the cylindrical portion perpendicular to the longitudinal axis of the cylindrical portion.

2. A bush according to claim 1, wherein said plastic is a synthetic resin possessing characteristics of resilience and wear resistance.

3. A bush according to claim 2, wherein said flange has a height, in a direction parallel to said longitudinal axis, that is larger than a gap amount between two members, whereby said flange heightg will be reduced upon mounting of the bush with said flange between the members.

4. A bush according to claim 1, wherein said flange has a height, in a direction parallel to said longitudinal axis, that is larger than a gap amount between two members, whereby said flange height will be reduced upon mounting of the bush with said flange between the members.

* * * * *